United States Patent [19]

Moore et al.

[11] 4,147,035

[45] Apr. 3, 1979

[54] ENGINE LOAD SHARING CONTROL SYSTEM

[75] Inventors: M. Samuel Moore; Charles F. Paluka, both of Northridge, Calif.

[73] Assignee: Semco Instruments, Inc., North Hollywood, Calif.

[21] Appl. No.: 878,304

[22] Filed: Feb. 16, 1978

[51] Int. Cl.² .................. F01B 21/02; F02D 25/00
[52] U.S. Cl. .................................................. 60/711
[58] Field of Search ............... 60/700, 701, 702, 704, 60/706, 710, 711, 716, 719

[56] References Cited

U.S. PATENT DOCUMENTS

| | | | |
|---|---|---|---|
| 2,958,338 | 11/1960 | Bachman | 60/710 X |
| 3,234,740 | 2/1966 | Moore, Jr. | 60/710 |
| 3,511,052 | 5/1970 | Gillespie | 60/711 |

*Primary Examiner*—Allen M. Ostrager
*Attorney, Agent, or Firm*—Poms, Smith, Lande, Glenny & Rose

[57] ABSTRACT

Two turbine engines are connected to a common gear box to drive a common load, such as a helicopter rotor, and circuitry is provided for controlling the two mechanically intercoupled engines in order to provide: (1) individual temperature shutoff for the engines, (2) limitation on the maximum total torque supplied by the two engines to avoid exceeding the power handling capability of the gear box for the associated load, (3) speed control for the engines, and (4) substantially equal sharing of the torque load by the two engines. By suitably combining the signals which require analysis, and supplying a single properly conditioned signal to the fuel control unit of each engine, tight control without oscillation or cycling may be achieved. Notch filtering to avoid reinforcement of mechanical resonances, and a variable response characteristic depending on the magnitude of the error signal may be included in the circuitry. Through the use of the circuitry noted above, and the avoidance of duplicate or conflicting feedback loops, a tighter servo control may be achieved without adverse results such as oscillation or overshoot. The pilot input is both a coarse mechanical input applied to set the fuel control units of both turbine engines to a level above the expected final power output level, and a relatively precise electrical signal which is supplied to the electronic control circuitry which cuts back the fuel supplied by one or both of the fuel control units.

18 Claims, 4 Drawing Figures

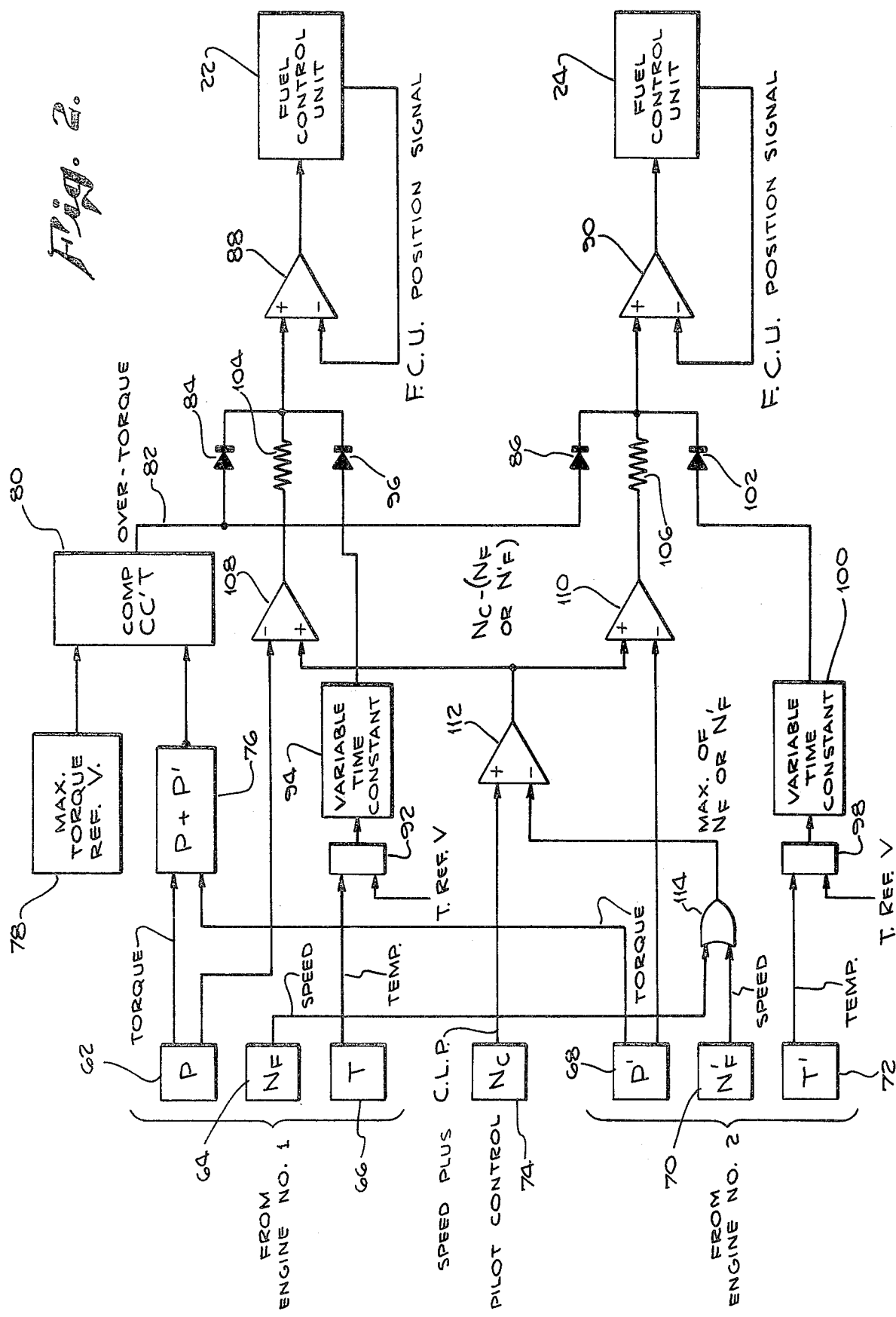

ENGINE LOAD SHARING CONTROL SYSTEM

RELATED CASES

The subject matter included in this specification is related to that disclosed in U.S. patent application Ser. No. 864,857 filed Dec. 27, 1977, entitled "Engine Power Management System," and having the same inventors and assignee.

FIELD OF THE INVENTION

This invention relates to closely coupled turbine engine systems.

BACKGROUND OF THE INVENTION

In certain types of power systems, for example, for helicopters, two turbine engines are connected to drive a single load, with each engine being capable of supplying the power requirements to continue the flight plan, even if the other engine is shut down. The power output from the two engines is applied to the rotor through a gear box which includes special clutches, which may be of a type known as Sprag clutches, to decouple either of the engines which is running at a lower speed than the others, from the drive train. In such systems it is desired that a number of factors be taken into consideration in controlling the engines, including (1) avoiding applying more power to the output gear train than it is capable of handling, (2) providing over-temperature control for the engines, (3) controlling the engine speed in accordance with pilot input, and (4) operating the two engines to deliver substantially equal torque to the output gear train. In such a system, if the individual controls and/or feedback loops for the various functions are individually implemented, it is possible, under adverse conditions, that the various engine controls will operate against one another and will cause some cycling of the engine or other controls. In addition, the response of the system may be made somewhat more "loose" than might be desired, in order to avoid adverse interaction between the various control functions and the resulting undesired cycling mentioned above.

Accordingly, an important object of the present invention is to provide an integrated dual engine control system with a single output control signal for each engine, thereby permitting more accurate and tighter system control and response.

SUMMARY OF THE INVENTION

In accordance with the present invention, two turbine engines which drive a single load are provided with an integrated load sharing power management system which provides a single output signal to the fuel control unit of each of the two engines. Inputs to the integrated load sharing circuit include the temperature of each engine, the speed of each engine, a signal representing the output torque or power of each engine, a pilot input signal giving the desired engine speed, and finally, output signals from each fuel control unit indicating the actual position of the fuel control valve actuating mechanism which is operated by the individual signals from the load sharing control circuit. Further, the control circuit provides the individual signals to the engines giving precedence to the following parameters in the indicated order: (1) temperature limiting for each engine is given first priority; (2) the maximum total power or torque determined by summing the output powers of the two engines and comparing with a reference level, is given second priority; (3) conforming the speed of the engine having the highest speed to the pilot control signal is given next priority; and (4) equalizing the load delivered by each engine, by comparison of the individual output powers or torques with the desired level, is then accomplished. Of course, under normal operating conditions, the load sharing function, which is listed as having the lowest priority or precedence, is the signal which is actually applied by the integrated load sharing circuitry to the individual fuel control units of the two engines.

In accordance with a feature of the invention, several control signals are combined to generate a fuel control signal for each engine, and high priority signals such as over-temperature for an engine, or over-torque for the common gear box are coupled through unidirectional circuits, which may include individual diodes, to instantly override other less critical signals such as speed control or load sharing signals, for example, which provide proportional modification of the fuel control signal.

In accordance with another aspect of the invention, the speed control signal is compared with the actual speed of the higher speed engine and amplified, and the resultant signal is combined in additional amplifiers with signals representing the actual output torque from each engine, to control each engine individually. By this arrangement the speed servo loop has higher gain and the speed error is corrected promptly.

In accordance with another aspect of the invention, cross-coupling is provided between the circuits controlling the fuel control units for the two engines, to reduce oscillation when one of the engines is sharply reduced in power output, for example, as a result of an over-temperature condition or the like. Circuitry is also provided for disabling or opening the cross-coupling circuit when one of the engines is shut down.

Further, circuitry may be provided for selectively increasing the speed of the output circuit response in the event of a large error signal, and for reducing response time, or increasing the damping of the circuit, at lower values of error signals, whereby the total system response time is reduced without causing system oscillation.

Other objects, features, and advantages of the invention will become apparent from a consideration of the following detailed description and from the accompanying drawings.

BRIEF DESCRIPTION OF THE DRAWINGS

FIG. 2 is a block diagram showing the logic circuitry included in the integrated load sharing circuit shown as a single block in FIG. 1;

DETAILED DESCRIPTION

Figure 1:
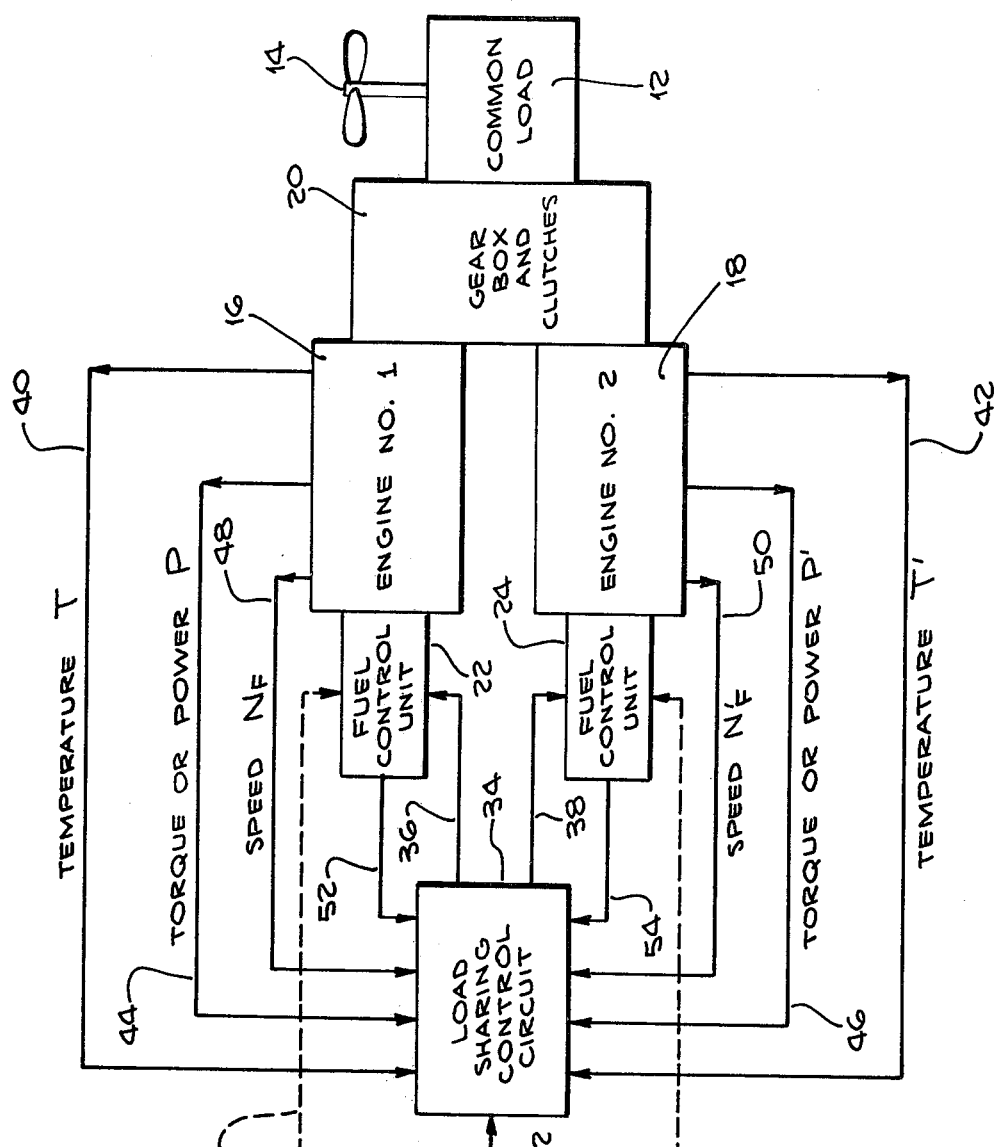
FIG. 1 is a block diagram showing the dual turbine engine system having a common load, and the inputs to the integrated load sharing control circuit.

Referring more particularly to the drawings, FIG. 1 is a block diagram of the overall system to which the present invention relates. To the right in FIG. 1 is shown a common load 12 which may be the rotor and control propeller of a helicopter, and this is indicated by the rotor 14 in FIG. 1. For safety purposes, two turbine engines 16 and 18 are provided. They drive the common load 12 through a power train including the gear box and clutches indicated by reference numeral 20. Each of the engines 16 and 18 is sufficiently powerful to keep the helicopter aloft and complete the trip to a safe landing location, if the other engine should fail. The power train 20 includes clutches of the type known as Sprag clutches which will permit the full application of power from either engine to the common load while disengaging the other engine which might have failed or be incapable of operation at full speed. The power train 20 is capable of supplying all the power which the load 12 can use. However, because of the safety feature mentioned above, that either engine 16 or 18 can supply sufficient power to minimally power the common load 12, the gear box 20 can be overstressed if full power is applied from both engine 16 and engine 18. Accordingly, as will be described in detail below, total output power is limited to avoid overstressing the power train 20.

In operation, the pilot moves a control lever forward and back to change the speed of the engines, and rotates the control lever to change the collective load pitch, of the helicopter rotor. The engines 16 and 18 are provided with fuel control units 22 and 24 which are mechanically actuated as indicated by the dashed lines 26 and 28 by the motion of the pilot's control lever, both a forward and back motion which determines speed, and the rotation of the control lever which determines the rotor pitch, and which varies the load. In FIG. 1 the block 30 indicates the mechanical and electrical input caused by the pilot's action in moving the control lever. In addition to the mechanical action by which the fuel control unit is directly controlled, as noted above, an electrical signal which is developed a transducer coupled to the pilot's control lever is supplied on lead 32 to the load sharing control circuit 34.

In practice, the system is arranged so that the mechanical control of the fuel control unit directly by the pilot sets the level of fuel flow at a higher point than is actually desired, and a fine control is supplied over the electrical leads 36 and 38 to reduce the fuel supplied by the individual control units 22 and 24, as will be described in greater detail hereinbelow. The load sharing control circuit 34 has a number of inputs including the temperature signal control leads 40 ad 42 from engine 16 and 18; output torque or power control leads 44 and 46, and output speed control leads 48 and 50. In addition, signals indicating the actual position of the valve in each of the fuel control units 22 and 24 are supplied to the control circuit 34 on leads 52 and 54, respectively.

Concerning the symbols which are used to designate different functions, in the present specification, the symbols T and T' represent the temperatures of engines 16 and 18; the output torque or power is designated by the letters P and P', and special attention should be given to the fact that the letter T does not represent torque but represents temperature. The speed of engine number one and engine number two, designated by reference numerals 16 and 18, respectively, are represented by the letters $N_F$ and $N_F'$, while the speed as requested by the pilot in positioning a control level is indicated by the symbol $N_C$.

Referring now to FIG. 2, this figure is a logic circuit diagram of the load sharing control circuit 34 of FIG. 1. Inputs to the logic circuitry of FIG. 2 include a source of output signals from Engine No. 1, including a pressure transducer 62 responsive to the pressure in the output power train from Engine No. 1; a speed transducer 64 which converts a variable frequency signal from Engine No. 1 into a variable voltage; and a thermocouple and associated circuitry 66 which provide an indication of the operating temperature of Engine No. 1. These inputs 62, 64, and 66 to the logic circuit of FIG. 2 are designated by the letters "P," "$N_F$" and "T," representing the power, speed, and temperature, respectively, of Engine No. 1. Similarly, blocks 68, 70, and 72 provide corresponding signals from Engine No. 2, and these functions are represented by the same letters, but with primed designations. Block 74 in FIG. 2 represents the electrical transducer which is coupled to the pilot control level, and it provides a desired output speed indication modified by the "CLP" function, where "CLP" stands for Collective Load Pitch.

In considering the logic circuit of FIG. 2, there are two "over-limit" functions which could cause a system failure in the event prompt corrective action is not undertaken. These two functions include (1) applying too much total torque from the two engines to the common output load or gear train, and (2) excessive operating temperature of either of the two engines. With regard to the first of these two "over-limit" functions, corrective action is taken to reduce the fuel supplied by both of the fuel control units 22 and 24 shown at the far right-hand side of FIG. 2. In connection with the over-temperature situation, however, corrective action is only taken with regard to the one engine which is overheating.

The two "over-limit" functions noted above only rarely come into play under normal operating conditions, and accordingly arrangements are provided for overriding the normal speed control and load sharing functions, as will be described in greater detail below.

Now, considering the total over-torque function, signals from the pressure transducers 62 and 68 are applied to the summing circuit 76, and the resultant total torque signal is compared with the maximum torque reference voltage signal provided by circuit 78, with the comparison being accomplished in circuit 80. When an over-torque signal appears on lead 82 at the output of comparison circuit 80, it is immediately applied through diodes 84 and 86 to the operational amplifiers 88 and 90 to promptly reduce the fuel supplied by the fuel control units 22 and 24.

The other "over-limit" function involves the operating temperature of the individual engines. First, considering Engine No. 1, the operating temperature of Engine No. 1 is indicated by thermocouple circuit 66, and the temperature indication signal is compared with a temperature reference voltage in circuit 92. The output signal from the comparison circuit 92 is applied through the variable time constant circuit 94 and diode 96 to the operational amplifier 88. Of course, no output signal is provided if the operating temperature of Engine No. 1 is within normal limits. However, if the operating temperature suddenly jumps to provide a large error signal at the input to circuit 94, this large amplitude danger signal is coupled through circuit 94 with a very low time constant so that the fuel control unit promptly reduces the flow of fuel to the over-heated engine. However, if a relatively small over-temperature signal appears at the input to circuit 94, a longer time constant is employed, and slower rebalancing of the servo system is accomplished, so that overshoot and oscillation do not occur. Incidentally, the nature of the variable time constant circuit 94 will be discussed below in connection with FIG. 3 of the drawings. Attention is also directed to the fact that the over-temperature signal, like the over-torque signal, is coupled to the operational amplifier 88 through a rectifier element, such as the diode 96, to permit prompt response and immediate override of any other signals supplied to the fuel control unit 22.

The temperature control circuit for Engine No. 2 operates in the same manner as described above, with the comparison circuit 98, variable time constant circuit 100 and diode 102 coupling the over-temperature signal to the operational amplifier 90 in substantially the same manner as discussed above for circuits 92, 94, and 96.

The circuitry providing speed control and load sharing, with precedence being given to speed control, will now be considered. These signals provide proportional operation of the fuel control units 22 and 24, and are supplied to the input of operational amplifiers 88 and 90 through resistors 104 and 106, to facilitate the overriding of their normal operation, by the over-limit signals which are coupled to the input of operational amplifiers 88 and 90 through rectifier circuit elements 84, 86, 96, and 102.

The speed and load sharing control circuits include the three operational amplifiers 108, 110, and 112, in addition to the "OR" circuit 114 which provides an output signal equal to the maximum of $N_F$ or $N_F'$. It is also important to note that the pressure transducers 62 and 68 provide a reduced voltage with increasing pressure.

In practice, the speed control signal is generated by the operational amplifier 112, with the pilot control signal being supplied to its positive input terminal, and the signal representing the speed of the engine which is operating at the highest speed, being applied to the negative input terminal of operational amplifier 112. Accordingly, as indicated in FIG. 2, the output from operational amplifier 112 which is supplied to the positive input terminal of operational amplifiers 108 and 110 is an error signal equal to the difference between signal $N_c$, and the higher of $N_F$ or $N_F'$.

A signal P representing the output torque of turbine Engine No. 1 is applied to the negative input terminal of operational amplifier 108, and a corresponding signal P' is applied to the negative input terminal of operational amplifier 110. The speed error signal is supplied equally to both engines, and if both engines are operating at the same output power levels, the signals supplied to both operational amplifiers 88 and 90 will be identical, and pilot control changes will produce equal signals supplied by the operational amplifiers 88 and 90 to the fuel control units 22 and 24.

Concerning the load sharing function, with the pressure transducers 62 and 68 providing reduced positive voltages with increased power output of the individual engines, and with the torque signals being applied to the negative input terminals of operational amplifiers 108 and 110, the output from these operational amplifiers will be proportional to the output power of the individual engines. Accordingly, where the action of the signal supplied by operational amplifiers 88 and 90 to the fuel control units 22 and 24, respectively, is to reduce the flow of fuel, the engine which is providing higher output power will be throttled back slightly while the engine providing lower power output will have less of a signal at the output of its operational amplifier, and will therefore tend to have increased fuel flow relative to the other engine, so that power balancing and load sharing will take place.

It is noted that the speed control signal is provided with greater amplification than the load sharing function; accordingly, this gives speed control precedence over load sharing. Also, as mentioned generally above, the speed control and load sharing functions are accomplished on a proportional basis by application of control signals through resistors at the input of the operational amplifiers 88 and 90. The "over-limit" signals, including the over-torque signals and the over-temperature signals, are coupled through rectifier components to the operational amplifiers 88 and 90, so that they may readily override the proportional speed and load sharing control signals. This gives these over-limit functions precedence over the speed control and load-sharing functions.

Figure 3:
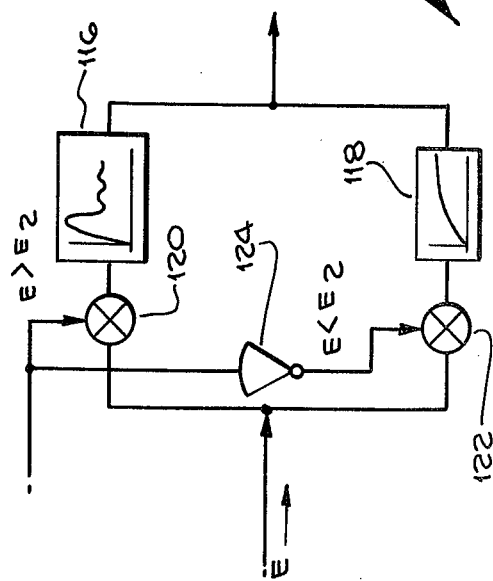
FIG. 3 is a schematic diagram indicating the nature of the certain circuits which may be employed in the present system.

The circuit of FIG. 3 indicates diagrammatically one possible implementation of the variable time constant circuits 94 and 100. More specifically, in FIG. 3, the upper circuit branch includes a circuit 116 having a relatively short time constant, and the lower circuit branch includes a circuit 118 having a long time constant. These variable time constants are accomplished through the use of suitable combinations of resistances and capacitances, as is well known in the art. If the incoming signal E is greater than a certain predetermined level, the switch 120 is opened and the switch 122 is closed; and conversely, if the error signal is below a certain predetermined level, the switch 122 is opened and the switch 120 is closed. This function can be facilitated through the use of the inverter circuit 124. If desired, circuitry including a single flip-flop coupled to both switching circuits 120 and 122 may be provided to insure simultaneous switching of the two circuits to opposite states.

By this type of circuit, as mentioned above, rapid response for high level error signals may be effected, while avoiding overshoot and oscillation as the error signal is reduced and the servo system approaches balance.

Figure 4:
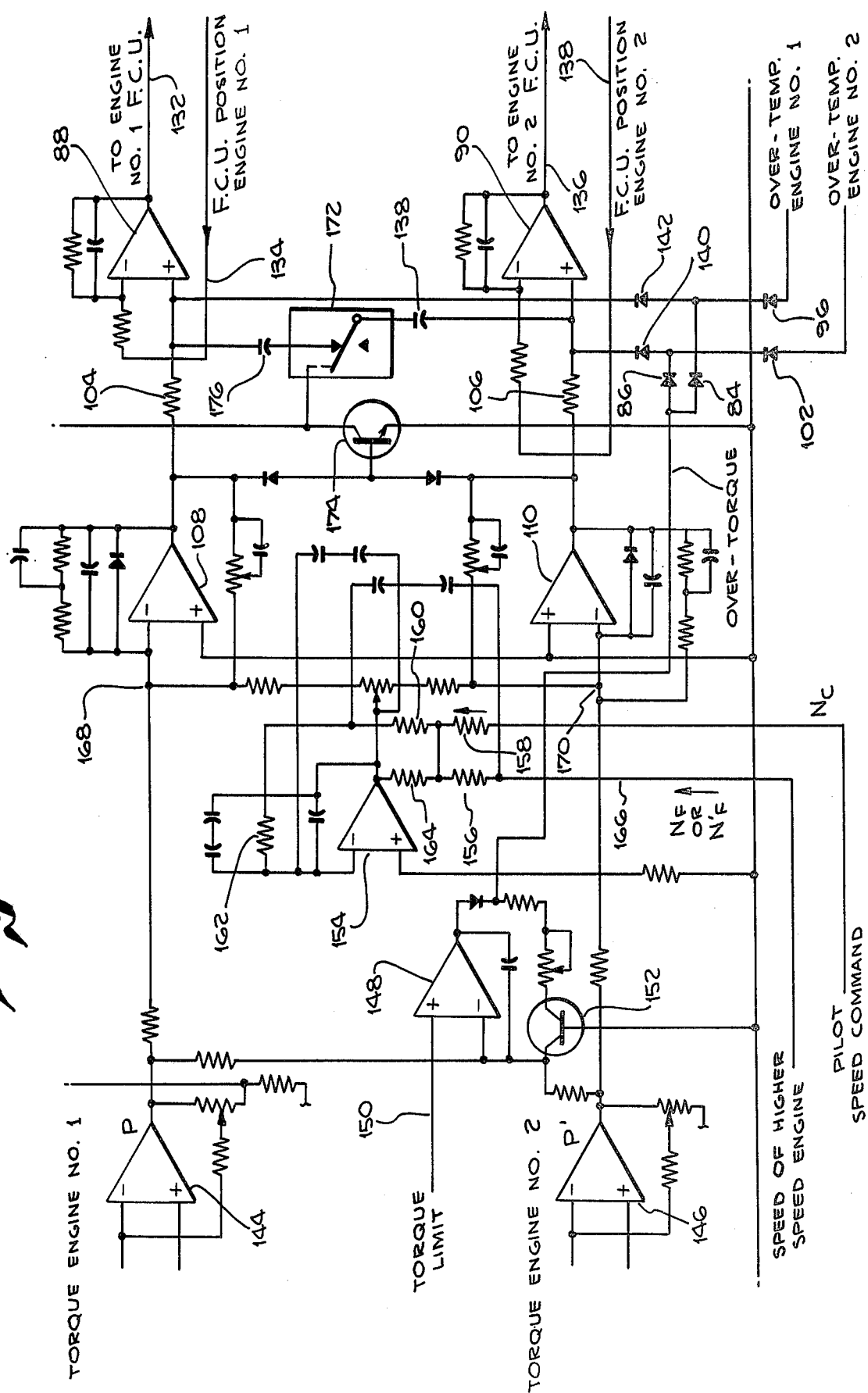
FIG. 4 is a somewhat more detailed circuit diagram indicating illustrative circuits for implementing certain portions of the circuit of 2.

The circuit diagram of FIG. 4 shows one actual implementation of a portion of the logic circuit of FIG. 2. It is to be emphasized, however, that the logic circuit of FIG. 2 could be implemented with many other forms of specific circuit components other than those shown in FIG. 4.

In FIG. 4, a number of the symbols and specific circuits shown in earlier figures of the drawings will be included. However, in the actual implementation of the circuit, minor changes and additions are always needed to make an operative and practical circuit from block or logic diagrams. Accordingly, the circuit of FIG. 4 will not necessarily correspond in every detail to the showings of the earlier figures of the drawing. Certain circuits which do closely conform to those shown in FIG. 2 include the operational amplifiers 88 and 90 which appear to the right in FIG. 4 and which are coupled to the fuel control units. More specifically, note in FIG. 4 that output lead 132 leads to the fuel control unit, and lead 134 provides a signal from the fuel control unit indicating the position of the fuel valve. Similarly, leads 136 and 138 associated with operational amplifier 90 lead to and from the fuel control unit for Engine No. 2.

Diodes 84, 86, 96, and 102 relating to the over-limit inputs, including both over-temperature, and excessive total torque, appear toward the lower right-hand corner of FIG. 4. The additional diodes 140 and 142 are employed to block certain "sneak" paths which would otherwise be present.

The signals representing the output torque of Engine No. 1 and Engine No. 2 appear at the output of the operational amplifiers 144 and 146 (to the left in FIG. 4) and are labeled "P" and "P'." They are summed by application through resistors to the negative input terminal of operational amplifier 148. The torque limit control signal is applied on lead 150 to the positive input terminal of operational amplifier 148. Accordingly, the signal at the output of operational amplifier 148 corresponds to that at the output of the comparison circuit 80 in FIG. 2, and represents the over-torque signal. It may be noted again that the torque signals at the output of operational amplifiers 144 and 146 decrease with increasing torque; accordingly, it is necessary to apply them to the negative input terminal of operational amplifier 148 to obtain the proper polarity reversal at the output of this operational amplifier. In passing, it may also be noted that transistor 152 provides current feedback for operational amplifier 148 without loading the summing point for the two torque signals at the negative input terminal to operational amplifier 148.

Operational amplifier 154 has the two speed signals, $N_c$ and the higher of $N_F$ and $N_F'$, summed at its negative input terminal. More specifically, the summing point is immediately above resistors 156 and 158, with the higher speed signal of the two engines being supplied at the lower end of resistor 156, and the pilot speed command signal $N_c$ being applied to the lower end of resistor 158. These combined signals are supplied through resistors 160 and 162 to the negative input of operational amplifier 154. Resistor 164 is relatively high in value and does not interfere with the foregoing summing operation. Incidentally, the signals on lead 166 representing the higher of the actual speeds are inverted or reversed in polarity so that the subtraction indicated in the showing of the operational amplifier 112 in FIG. 2 actually occurs at the summing point above resistors 156 and 158. In addition, by the application of the combined signals to the negative input terminal of operational amplifier 154, an additional reversal of polarity is present in the signal at the output of operational amplifier 154.

The torque output signal from operational amplifier 144 relating to Engine No. 1 is summed with the output from operational amplifier 154 at point 168. Similarly, the output torque relating to Engine No. 2 as represented by the signal at the output from operational amplifier 146, is summed with the output from operational amplifier 154 at point 170 at the negative input to operational amplifier 110. With the inversion of phase provided by operational amplifiers 108 and 110 between their negative input terminals and their output terminals, the speed control and load sharing signals are in the proper phase for application to resistors 104 and 106 leading to the positive inputs to operational amplifiers 88 and 90, respectively.

A C-mos switch 172 and control transistor 174 facilitate single engine operation, in cases where one of the two helicopter engines is shut down. More specifically, under normal operating conditions, with both engines operative, a cross coupling circuit between the positive terminals of operational amplifiers 88 and 90 is provided and this cross coupling circuit includes capacitors 176 and 178. Under normal operating conditions, with switch 172 closed, when one of the engines is slowed down, perhaps because of over-temperature conditions, the other engine would normally pick up in speed rapidly, and oscillation or overshoot could occur. The cross coupling circuit, including capacitors 176 and 178 will tend to slow the normal system response to this situation, and prevent the undesired overshoot or oscillation. Transistor 174 is normally off, and the shutting down of either one of the engines serves to turn it on, and its operation operates the C-mos switch 176 to open the cross-coupling circuit.

The other circuit elements and components, as shown in FIG. 4, are employed to provide suitable biasing, filtering, isolation, or other similar functions in the circuit.

Reference is again made to our prior copending patent application cited hereinabove, which discusses certain modes of operation of turbine engine fuel control units, and, for completeness, the disclosure of the aforesaid application is hereby incorporated by reference into this specification.

In conclusion, it is to be understood that the particular circuit implementation disclosed herein may be varied in accordance with normal electronic design techniques. For example, the variations discussed above between the simplified logic circuit of FIG. 2 and the actual implementation as shown in FIG. 4 are both encompassed within the spirit and scope of the present invention.

What is claimed is:

1. A turbine engine load sharing system comprising:
   a first turbine engine including a first fuel control unit;
   a second turbine engine including a second fuel control unit;
   electronic means for providing a variable input control signal from to select the desired engine output speed for both of said two engines;
   first and second electronic temperature transducer means for indicating the operating temperature of said first and second engines, respectively;
   first and second electrical means for indicating the output power of said first and second engines, respectively;
   first and second electrical speed transducers for indicating the operating speed of said first and second engines, respectively;
   electronic control means for receiving (1) said pilot speed control signal, (2) said engine temperature signals, (3) said engine output power signals and (4) said engine output speed signals;
   means for connecting said electronic control means to vary individually the fuel supplied by said first and second fuel control units;
   said electronic control means including (1) circuit means for reducing the fuel supplied by the fuel control unit to either engine which is above its predetermined temperature limit; (2) circuit means for limiting the total power supplied by said two engines; (3) circuit means for conforming the speed of at least one of said engines substantially to the speed selected by the pilot; (4) circuit means for substantially equalizing the power supplied by said two engines.

2. A turbine engine load sharing system as defined in claim 1 further comprising a single load; and gear box means for applying power from said two engines to said single load.

3. A turbine engine load sharing system as defined in claim 1 wherein said power indicating means are pressure transducers.

4. A turbine engine load sharing system as defined in claim 1, further comprising:
   means for supplying from said electronic control means, to said first engine fuel control unit, a single control signal; and to said second engine fuel control unit, another single control signal; and wherein said electronic control means includes means for giving precedence in the generation of said single control signals to (1) temperature limit control (2) total power limit control (3) speed control and (4) load sharing control, in that order of precedence.

5. A turbine engine load sharing system as defined in claim 2 wherein said electronic control means includes means for summing output torque signals from said two engines and comparing the sum with a reference value.

6. A turbine engine load sharing system as defined in claim 1 wherein said electronic control means includes means for subtracting an operating parameter of each said engine indicative of its torque output from an input signal indicating a selected desired torque output level, and for applying an individual correction signal derived from said difference to the respective fuel control unit of each engine.

7. A turbine engine load sharing system as defined in claim 5 wherein pressure transducer means are provided for supplying an indication of the output torque of each said engine to said electronic control means.

8. A turbine engine load sharing system as defined in claim 1 further comprising notch filter circuitry having reduced frequency response at the load resonance frequencies, connected between said electronic control means and said fuel control units.

9. A turbine engine load sharing system as defined in claim 1 further comprising means for non-linearly changing the rate of change of the output signal from said electronic control means depending on the magnitude of the difference between the desired output speed as selected by the pilot and the actual output at the load.

10. A turbine engine control system as set forth in claim 1 further including means for cross-coupling said connecting means to reduce the effect of sudden changes in the operation of one engine, on the other engine.

11. A control system as set forth in claim 10 further comprising means for disabling said cross-coupling means when one of said engines is shut down.

12. A turbine engine control system comprising:
   a first turbine engine including a first fuel control unit;
   a second turbine engine including a second fuel control unit;
   electronic means for providing a variable input control signal from to select the desired engine output speed or power for both of said two engines;
   means for generating engine speed and/or power equalization signals;
   means for generating urgent over-limit warning signals indicating a system condition which will produce system failure within a very short period of time;
   first and second electronic circuit means for supplying control signals to change the fuel supplied to said first and second engines, respectively, by modifying the control signal applied to the respective fuel control units;
   means for utilizing said speed and/or power equalization signals to proportionally modify said fuel control signal; and
   unidirectional circuit means for connecting urgent over-limit warning signals to override the engine speed and/or power equalization signals and directly modify said fuel control signal to prevent incipient engine or system failure.

13. A turbine engine control system as defined in claim 12 wherein said means for generating over-limit warning signals includes means for signalling over-termperature conditions in either of the engines.

14. A turbine engine control system as defined in claim 12 wherein said means for generating urgent over-limit warning signals includes means for signalling total output power in excess of predetermined safe levels of total output power.

15. A turbine engine load sharing and control system as defined in claim 13 wherein said system includes means for generating both engine speed control signals and power equalization signals, and also means for generating urgent over-limit warning signals including means for warning of excessive total output power.

16. A turbine engine control system as defined in claim 12 wherein said unidirectional circuit means includes semiconductor switching means.

17. A turbine engine load sharing system comprising:
   a first turbine engine including a first fuel control unit;
   a second turbine engine including a second fuel control unit;
   electronic means for providing a variable input control signal to select the desired engine output speed for both of said two engines;
   first and second electrical means for indicating the output power of said first and second engines, respectively;
   first and second electrical speed transducers for indicating the operating speed of said first and second engines, respectively;
   electronic control means for receiving (1) said pilot speed control signal, (2) said engine output power signals, and (3) said engine output speed signals;
   means for connecting said electronic control means to vary individually the fuel supplied by said first and second fuel control units;
   said electronic control means including (1) circuit means for conforming the speed of at least one of said engines substantially to the speed selected by the pilot; and
   said electronic control means includes (1) amplifier means for comparing the pilot speed control signal with the highest of the turbine engine speeds and for providing a speed error signal, (2) individual amplifier means for individually receiving said engine output power signals and supplying amplified output signals to decrease fuel supplied to the engine having the higher power output, and (3) means for amplifying the speed error signal to a significantly greater extent than the amplification of said output power signals, and supplying the amplified speed error signal to correct the speed of both of said engines, whereby the additional amplification imparted to the speed error control signal increases the system response to the speed error signals as compared with the load sharing or equalization signals.

18. A turbine engine control system as defined in claim 17, wherein said speed error signals are applied from said comparing means to both of said individual amplifying means.

* * * * *

UNITED STATES PATENT AND TRADEMARK OFFICE
CERTIFICATE OF CORRECTION

PATENT NO. : 4,147,035
DATED : April 3, 1979
INVENTOR(S) : M. Samuel Moore and Charles F. Paluka It is certified that error appears in the above—identified patent and that said Letters Patent are hereby corrected as shown below:

Claim 1, line 36, delete the word "from".

Claim 12, line 7, delete the word "from".

Signed and Sealed this

Seventeenth Day of July 1979

[SEAL]

Attest:

*Attesting Officer*

LUTRELLE F. PARKER
*Acting Commissioner of Patents and Trademarks*